United States Patent [19]

Wilson, III

[11] Patent Number: 4,817,842

[45] Date of Patent: Apr. 4, 1989

[54] DOOR AND SPRING ASSEMBLY FOR A PAPER FEED MECHANISM

[75] Inventor: Joseph T. Wilson, III, Endicott, N.Y.

[73] Assignee: International Business Machines Corporation, Armonk, N.Y.

[21] Appl. No.: 150,348

[22] Filed: Jan. 29, 1988

[51] Int. Cl.[4] .......................... G03B 1/30; B41J 11/32

[52] U.S. Cl. ........................................ 226/74; 226/82; 400/616.2

[58] Field of Search ........................ 226/74, 75, 82, 87; 400/616-616.2

[56] References Cited

U.S. PATENT DOCUMENTS

| | | | |
|---|---|---|---|
| 540,707 | 6/1895 | Wolf . | |
| 2,059,582 | 11/1936 | Hurewitz . | |
| 2,943,582 | 7/1960 | Bonanno . | |
| 3,477,626 | 11/1969 | Hilpert . | |
| 3,842,463 | 10/1974 | Wehner . | |
| 3,938,721 | 2/1976 | Staneck et al. | 226/75 |
| 3,950,818 | 4/1976 | Holmes . | |
| 4,129,239 | 12/1978 | Hubbard | 226/75 |
| 4,134,516 | 1/1979 | Sullo . | |
| 4,226,353 | 10/1980 | Blaskovic et al. | 226/74 |
| 4,527,755 | 7/1985 | Rood et al. | 242/199 |
| 4,614,287 | 9/1986 | Veno et al. | 226/74 |
| 4,650,358 | 3/1987 | Lohrmann et al. | 226/74 X |

OTHER PUBLICATIONS

IBM Maintenance Library 3203 Printer, Models 3 and 4 Parts Catalog, Mar. 1978, pp. 70, 71.

*Primary Examiner*—Stuart S. Levy
*Assistant Examiner*—Steven M. duBois
*Attorney, Agent, or Firm*—John S. Gasper

[57] ABSTRACT

A feed mechanism for a printer having a door with hinge elements connected by hinge pins to the tractor body so as to be rotatable between first and second position. The hinge elements have rotary cams with convex and planar surfaces. A single flat steel spring is simply supported between its ends by a platform. The spring is held in flexed condition in a continuous bend by the platform and the cams of the hinge elements. The platform has coplanar support edges for simply supporting the spring. Alignment and centering means on the platform maintain the horizontal axis of the spring aligned with the common axis of the hinge pins and centered between the cams.

21 Claims, 4 Drawing Sheets

DOOR AND SPRING ASSEMBLY FOR A PAPER FEED MECHANISM

FIELD OF THE INVENTION

This invention relates to paper feeding mechanisms and particularly to tractor feed mechanisms of the type commonly used for feeding paper in a printer.

BACKGROUND OF THE INVENTION

Tractor feed mechanisms commonly used in a printer apparatus comprise a continuous flexible pin belt wrapped around a pair of drive sprockets or pulleys rotatably supported by a frame assembly or body mountable on drive and guide bars of the paper feed assembly of the printer. In addition to supporting the pin belt and drive sprockets, the tractor body has surfaces for guiding paper so that perforations near the edges of the paper are in proper alignment to receive and be engaged by drive pins carried by the belt as it is rotated by the sprockets to feed the paper past a print station of the printer. The paper may be a continuous web and may have multiple layers in which case it is commonly called multipart forms, and the tractor feed mechanism is referred to as a forms feed tractor.

It is common practice to provide such feed mechanisms with a door or cover for constraining the paper so that it remains in contact with the guide surface of the tractor body and does not become disengaged from the pins. The door is provided with a hinge connection to the body. This enables the door to be rotated around the hinge axis between a closed position and an open position to allow paper to be assembled onto or removed from the tractor. When in the closed position the underside of the door is more or less parallel with the paper guide surface and belt, and forms one side of a slot within which the paper feed holes are engaged by the feed pins of the belt. The open position of the door can be as much as 180 degrees from the closed position, but for operator convenience in loading forms onto the tractor, the door position is commonly 90 degrees or slightly more from the closed position. Stops are commonly provided on the frame assembly or the door to limit door rotation at both the closed and open positions. Traditionally a helical spring is used to force the door against the stops with maximum extension of the spring occurring between the open and closed positions. Examples of such tractors may be seen in U.S. Pat. Nos. 3,938,721; 4,129,239 and 4,226,353 which are considered representative.

A common problem with tractors having stops for holding the door at the open position occurs when it is desired to have more than one stable open position. There is the further problem of damage occurring when an unintended force is applied in a manner which tends to force the door beyond the open stop position. An instance of a force causing damage occurs when the tractor doors are inadvertently left open and the printer is of the type having a swing gate construction. Printers having swing gate construction include the IBM 4245 and 4248 Printers. In that type printer, the tractors are mounted on a stationary frame while the type carrier, such as an engraved type band, and the ink ribbon assemblies are mounted on a swing gate which is opened by an operator to install the print forms into the tractors. Closing the gate while the tractor door remains open at or near the 90 degree position can cause damage when the swing gate is closed, which because of its superior mass and force, drives the tractor beyond the open position fixed by the stop. The damage can be especially severe when the tractor door and/or frame are made of elastomeric materials.

One solution for this problem makes use of spring biased hinges which comprise a spring acting with a detent mechanism which is part of the tractor door hinge structure. The spring may be a flat cantilever spring which is spring loaded against the detent or it may be a wire element loaded against a detent, which wire also functions as the pivot pins. In a third version, the door has pawl shaped arms and the spring means takes the form of a mass of molded elastomer having a cavity in which detent positions are formed to be engaged and deformed by rotation of the arms with the door. Examples of such structures are shown in U.S. Pat. Nos. 3,477,626; 4,614,287 and 4,650,358 and in printed publication entitled IBM 3203 Printer, Manual of Operations (S135-1003-3), pp. 70 and 71.

While such spring loaded hinge structures reduce somewhat the risk of damage to doors in the open position, they are excessively complex and costly to make and assemble. In addition, they are unable to be made relatively compact and small and still provide the level of force necessary for the door to prevent paper from being lifted from the pins as in cases where the tension and buckling of the paper tends to occur in high speed line printers using multilayer forms.

Spring loaded hinge structures are also known for use with doors on other devices such as cabinets. Examples of such structures are shown in U.S. Pat. Nos. 540,707; 2,059,582; 2,943,582; 3,842,463; 3,950,818; 4,134,516; and 4,650,358. A spring hinge structure for a tape cassette is shown in U.S. Pat. No. 4,527,755. None of these patents are concerned with the problems related to feed mechanisms such as damage to the tractor door by swing gate of a printer nor are they concerned with a problem like constraining paper forms on a pin feed belt in opposition to lifting forces generated as a result of the feeding of paper forms.

SUMMARY OF THE INVENTION

In accordance with the invention, an improved feed mechanism is provided which is more simple to manufacture and assemble. The invention also provides a feed mechanism having an improved door and spring assembly capable of having more than one stable open position and which is capable of being used in a manner which avoids damage caused by improper operation of the tractor door such as where a swing gate in closed in a printer. The invention further provides a feed mechanism with an improved door and spring assembly in which the door is capable of exerting greater constraining force on paper during feeding through the tractor.

Basically the invention provides a feed mechanism comprising a tractor frame or body, a door with spaced hinge elements and pivot means connecting the door to the tractor body and permitting rotation of the door back and forth between first and second positions. In accordance with the invention, each hinge element has a cam means rotatable with the door. The rotary cam means and pivot means have a common axis. Each cam means has first and second cam surfaces radially displaced from the common axis. The tractor body has a platform located between the hinge members. An elongate flexure beam applies spring force to the cam means for moving the door between the first and second positions. The flexure beam in its relaxed state prior to assembly is a straight piece. When assembled, the flexure beam is held in flexed condition with a continuous bend by the platform and the cam means on the hinge elements. The flexure beam is simply supported between its ends by the platform with the ends frictionally engaged by the cam means. No fixed attachment is made of the spring to the tractor body as in the case of cantilever type structures. Manufacture and assembly is greatly simplified.

In the preferred form, the flexure beam is a single flat spring and the platform has a flat surface with a pair of parallel support edges extending transversely to the longitudinal axis of the spring. The spring is simply supported by the pair of support edges thereby providing greater stability. With this arrangement, the spring including the portion between the support edges is allowed to flex in a continuous bend. This makes use of the full length of the spring and provides greater spring force for a given sized spring than is achievable with cantilever or wire type hinge structures. Also in the preferred form, the spring is designed with portions having a tapered width or with triangular openings between its ends. This produces a spring with essentially constant bending stresses throughout its length thereby making most efficient use of the available space. Alignment means and centering means may also be provided on the platform whereby the longitudinal axis of the spring is maintained aligned with the common axis of the cams and the spring is centered between the hinge elements to assure against shifting and disengagement of the spring ends from the cams.

Further features of the preferred form of the invention are that the first and second surfaces of the cams are convex and planar. The convex surface engages the ends of the spring on one side of the longitudinal axis when the door is at the first position. The ends of the spring are engaged on both sides of the longitudinal axis by the planar surface of the cam means when the door is in the second position. The net effect of this is that a net torque will be applied to the door in its first position while essentially no turning moment is applied to the door in the second position.

In the preferred form, the convex surface of the cam means may have a greater radial distance from the common axis than the planar surface. This gives the further effect that the spring is flexed more in the first than in the second position thereby producing greater spring force at the first position than at the second position. Thus if the first position door is the closed position, a greater spring force and torque is obtainable for resisting lifting forces from paper being fed through the feed mechanism. If the second position is the open position of the tractor door, the position is not only stable but is held with less force for opposing movement to a further open position or the closed position by a human operator or a swing gate of a printer. More than one stable position is achievable by providing the cam means with additional planar and convex surfaces. In the preferred embodiment the cam surfaces are beveled surfaces formed directly on the hinge members of the door. The slope of the bevel coincides with the angle of bend of the spring at the ends where contact is made with the cam surfaces.

The foregoing and other features, objects and advantages will be apparent from the following detailed description of the several embodiments as illustrated in the accompanying drawings.

DETAILED DESCRIPTION OF THE INVENTION

Figure 1:
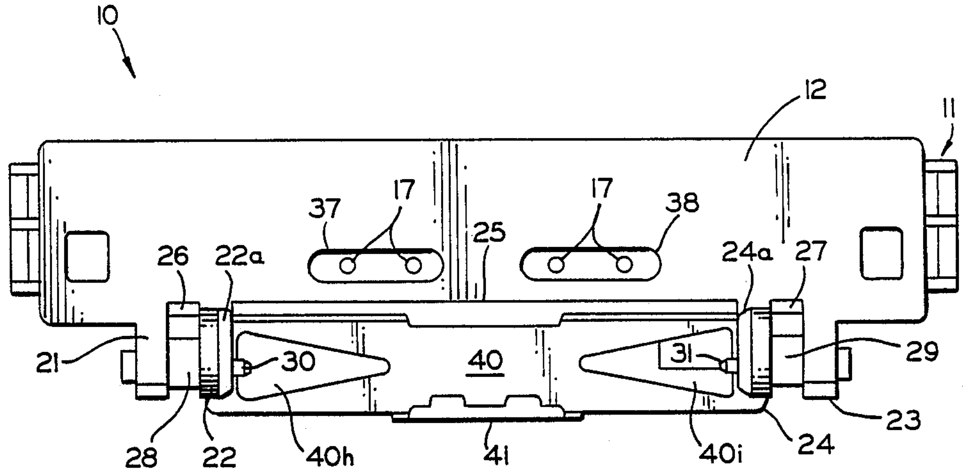
FIG. 1 is a top plan view of a forms feed tractor using the invention.
Figure 2:
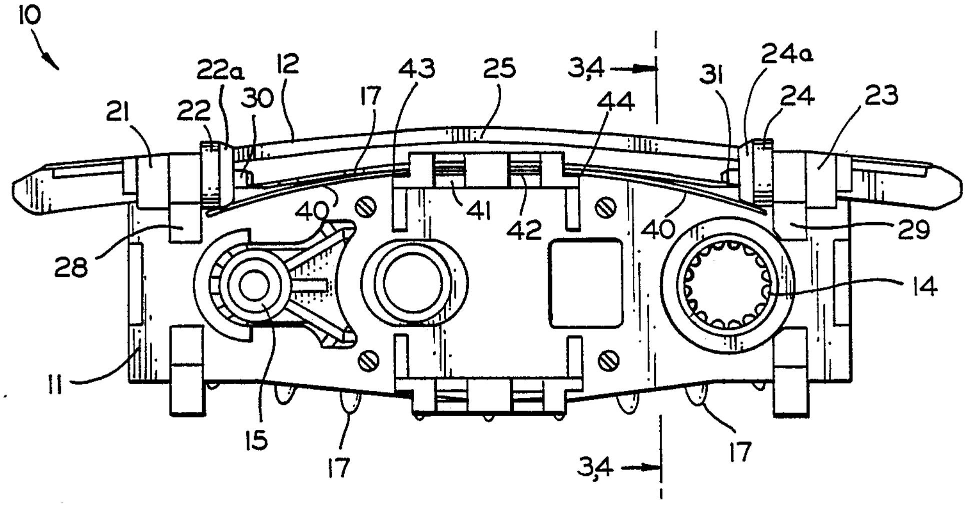
FIG. 2 is a right side elevational view of the tractor shown in FIG. 1.
Figure 3:
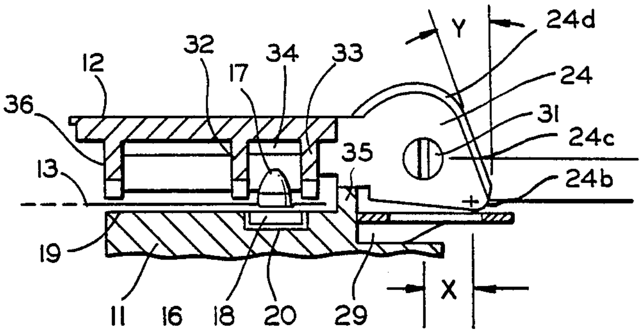
FIG. 3 is an end sectional view of a portion of the tractor of FIG. 1 showing the tractor door in closed position.
Figure 4:
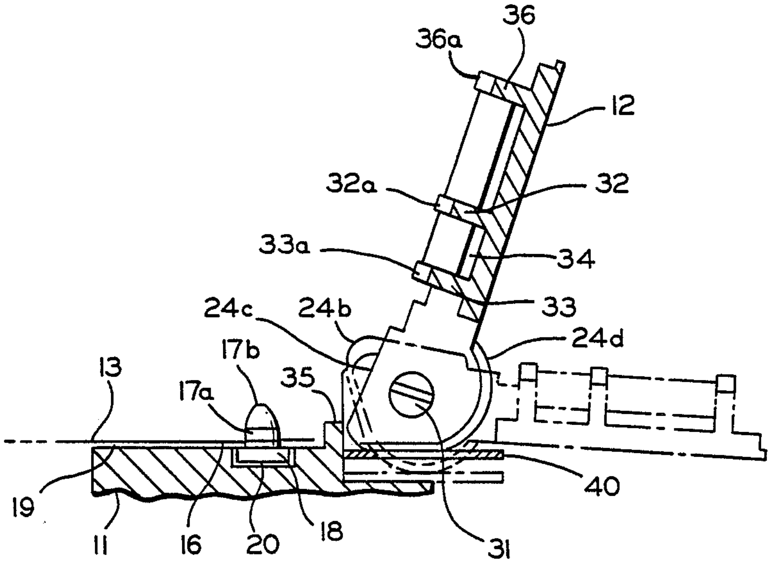
FIG. 4 is a second end sectional view of a portion of the tractor of FIG. 1 showing the tractor door in open position.

As seen in the figures, feed mechanism 10 comprises tractor body 11 and door 12. Paper 13 is fed by a continuous flexible pin belt wrapped around a pair of sprockets 14 and 15 rotatably supported by body 11. Sprocket 14 is driven by a shaft. The pin belt is of a type having drive elements attached to an endless thin flexible steel band 16. The drive elements comprise feed pins 17 extending from the outer surface and a gear teeth or lugs 18 extending the inner surface of the band 16. As seen in FIGS. 3 and 4, band 16 is supported between sprockets 14 and 15 by guide surface 19 of body 11. A channel 20 in guide surface 19 receives lugs 18. The guide surface 19 may be curved over the distance between the sprockets as shown, or may be essentially flat. Feed pins protruding from the top of band 16 extend through a line of feed holes near one edge of paper 13. As is well known, the feed pins 17 have a base portion **17*a* and top portion or cap 17*b*. Generally, base portion 17*a* is cylindrical and engages the paper inside the feed holes. Cap 17*b* is generally tapered for ease of entry and withdrawal from the feed holes as the belt is moved off and onto the sprockets. Within the distance between the sprockets, paper 13 rests on the top surface of band 16 and guide surface 19 on either side of band 16. Paper 13 may have a one or more layers. The height of base portion 17*a* of pins 17 will be somewhat greater than the thickness of the multiple layer paper. A problem occurs when paper 13 buckles or has a crease which causes it to tend to rise above the base portion 17***a* onto the cap 17*b*. Door 12 functions to constrain paper from rising above the base portion 17*a*.

Door 12 is essentially an elongate rectangular plate which is wide enough to span the width of band 16 and most of the adjacent portions of guide surface 19 and at least long enough to span the distance between the sprockets. Door 12 is pivotally connected to body 11 by a hinge structure whereby door 12 can be manually rotated between a closed and one or more stable open positions. The hinge structure includes a pair of bifurcated hinge elements 21, 22, 23 and 24 extending more or less orthogonally from one edge 25 of the door. Rectangular grooves 26 and 27 between hinge elements 21 and 22 and 23 and 24 receive correspondingly spaced hinge posts 28 and 29 projecting from the side of body 11. The pivot connection is formed by hinge pins 30 and 31 inserted through aligned pin holes, (not shown) in the respective hinge members and flanges. Hinge pins 30 and 31 may be of any known type but preferably are of the split shaft type dimensioned to be snap fitted into the pin holes. When assembled, hinge pins 30 and 31 are aligned on a common axis, which axis lies in a plane parallel with the edge 25 of door 12 and above the guide surface 13. As will be explained further on, the hinge element 22 has a beveled inner edge 22*a*. Likewise hinge element 24 has a beveled inner edge 24*a*. Hinge elements 22 and 24 thus also comprise rotary cams having an axis common with the hinge pins 30 and 31.

The underside of door 12 has spaced parallel ridges 32 and 33 which form a channel 34 for receiving feed pins 17. Ridges 32 and 33 and channel 34 can be rectangular in cross section. Channel 34 is deep and wide enough so that feed pins 17 will not engage its bottom or inner side walls. As shown in FIG. 3, the bottom surfaces 32*a* and 33*a* of ridges 32 and 33, define the door gap. The size of the gap is set by step 35 on the right edge of body 11 which is engaged by the underside of door 12 when in closed position. Alternatively, step 35 may be a ridge or step formed on the underside of door 12 for resting on the top of body 11. The bottom surfaces 32*a* and 33*a* of ridges 32 and 33 are best seen in FIG. 4. With door 12 in closed position, bottom edges 32*a* and 33*a* are about level with top of base portion 17*a* of pins 17. The bottom surfaces 32*a* and 33*a* are aligned above the top surface of band 16 on either side of feed pins 17. A third ridge 36 on the underside of door 12 has a bottom surface 36*a* which overlays paper 13 some inward from band 16 near the inner edge of guide surface 19. The position of feed pins 16 within the feed holes of paper 13 can be observed through windows 37 in door 12.

As stated, the door gap is set by the step 35 on body 12. The height of step 35 is predetermined in accordance with the thickness of the paper 13. In printers made for printing on paper of different thicknesses which may be either single or multipart forms, the size of the gap is selected to be slightly greater than the maximum flat dimension of the multipart form. In this way the paper moves through gap without engaging the bottom surfaces 32*a*, 33*a* and 36*a* except when paper buckles, has a crease or is lifted by tension or compression forces induced therein during feeding. Thus paper feeding can be subjected to lower friction forces thereby reducing the loading on the pin belt and drive system and at the same time can effectively constrain paper 13 from lifting above the base portion 17*a* of pins 17.

In accordance with the invention, a single flat spring 40 provides the spring force used to move and load door 12 against step 35 to form and maintain the gap. Spring 40 also moves and maintains door 12 toward and in one or more stable open positions. Spring 40, which in its relaxed state is a flat piece, is supported in flexed condition between a platform 41 and hinge members 22 and 24. Platform 41 extends outwardly from the side of tractor body 11 and laterally a part of the distance between hinge elements 22 and 24 and is preferably an integral part of body 11. Platform 41 has a horizontal planar surface 42 which ends with parallel support edges 43 and 44. Edges 43 and 44 are coplanar with each other and transverse to the longitudinal axis of spring 40. Spring 40 is not physically attached to but is simply supported by edges 43 and 44 of platform 41. Thus edges 43 and 44 act as simple fulcrums around which spring 40 is bent which allows spring 40 to be flexed with a continuous bend throughout its length including the portion between support edges 43 and 44. In this way the full length of spring 40 between hinge elements 22 and 24 is available for storing spring energy to be delivered to door 12.

As previously stated, hinge elements 22 and 24 are structured with beveled edges 22*a* and 24*a* respectively which form rotary cams in frictional engagement with the ends of spring 40. Each is provided with convex and planar cam surfaces. Both are identical in structure. Only the cam for hinge member 24 will be described.

As seen in FIG. 3, the cam on hinge element 24 comprises cam surfaces 24*a*, 24*c* and 24*d* radially displaced about hinge pin 31. Surfaces 24*b* and 24*d* are convex while surface 24*c* is planar. Convex surface 24*b* is against the spring 40 when door 12 is closed. Contact is made by convex surface 24*b* with spring 40 on one side of its center, i.e. the longitudinal axis, at a distance X from the rotational axis formed by hinge pin 31. The counter clockwise torque of door 12 about its hinge pin 31 is the product of the spring force and the distance X, the moment arm at which this force acts. It is this torque which operates against the lifting force of paper on the inner side of door 12. In moving clockwise from the closed position of FIG. 3 to the open position of FIG. 4, convex surface 24*b* contacts spring 40 along a transverse line to the other side of center. At that point, a clockwise torque on door 12 causes it to rotate toward the open position shown in FIG. 4. As shown in FIG. 4, the planar surface 24*c* makes contact with spring 40 on both sides of its center, i.e. the longitudinal axis. Thus the moment arm is zero and the net torque on door 12 is zero. Spring 40 acting on planar surface 24*c* holds door 12 in an open position. The angle Y, which is the slope angle of planar surface 24*c*, determines the angle of the door at its open position. In the preferred embodiment, angle Y is slightly more than 90 degrees but less than 180 degrees from the closed position. Clockwise rotation of door 12 beyond the open position, brings convex surface 24*d* into contact with spring 40 at a point to the right of center of spring 40 as shown by the broken lines in FIG. 4. Thus a counterclockwise torque is produced on door 12 causing in to return to the initial open position from second convex surface 24*d*. Such would be the case if door 12 was bumped manually or otherwise temporarily rotated further clockwise from the open position and then released. Should a second stable open position be desired, convex surface 24*d* could have a relatively short arc and would be immediately followed by a second planar surface (not shown) whose angle relative to planar surface 24c would determine the angle of the second open position. The magnitude of the spring force acting on door 12 can be different at the closed and the open positions. Thus, the radial distances to convex surface 24b, planar surface 24c and convex surface 24d can by varied. Thus, the radial distance to convex surface 24b can be greater than the other radial distances so as to obtain greater loading of door 12 step 35 while having lighter loading at the open and beyond opening positions. Thus a swing gate forcing door 12 beyond its open position would encounter lesser opposition and would be less likely to produce serious damage to door 12.

A further feature is to contour convex surface 24c so that in traversing spring 40 along the contact line transverse to its center axis, the maximum contact points do not exceed ⅔ of the width of spring 40. In this way, spring 40 is least likely to rotate on platform 41 as a result of torque loading on either side of the longitudinal axis. This is particularly important where the deflection of spring 40 by convex surface 24c is quite large to obtain correspondingly large torques on door 12 for constraining paper 13 against lifting from feed pins 17.

Figure 5:
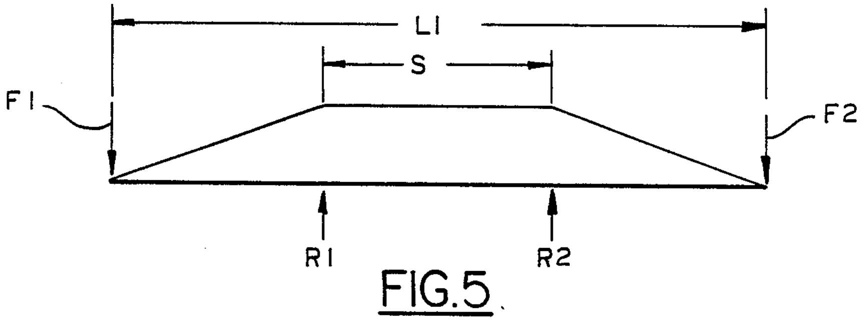
FIG. 5 is a bending moment diagram for explaining the function of the leaf spring used in the tractor mechanism of FIG. 1.
Figure 6:
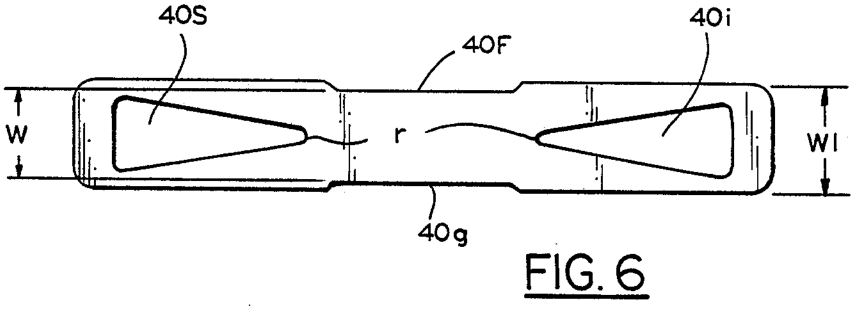
FIG. 6 is a plan view of a first embodiment of the leaf spring used in the tractor mechanism of FIG. 1.
Figure 7:
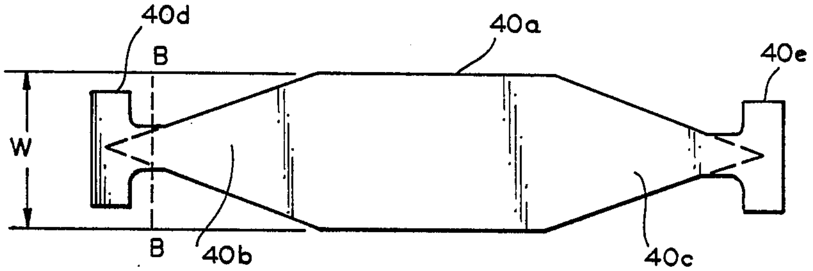
FIG. 7 is a plan view of a second embodiment of the leaf spring used in the tractor mechanism of FIG. 1.
Figure 8:
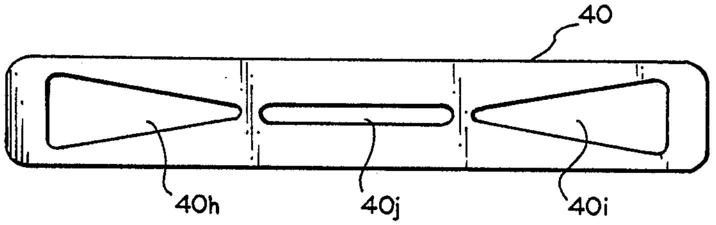
FIG. 8 is a plan view of a third embodiment of the leaf spring usable in the tractor mechanism of FIG. 1.

FIG. 5 explains the design of spring 40. The forces acting on spring 40 are the two downward cam forces F1 and F2 and the upward reaction forces R1 and R2 at support edges 43 and 44. Since spring 40 is free to bow above platform 41, the bending moment is constant between the reaction forces. FIG. 7 shows a modified theoretical flexure beam of uniform thickness and uniform bending stresses. Such a beam would have a central section 40a of constant width W and tapered sections 40b and c. To satisfy the moment diagram of FIG. 5, tapered sections should end at a point as indicated by the broken lines. However, because of the need for the tractor cams to engage spring 40 on either side of the center line, end sections 40d and e are provided. Such a beam structure, while a practical compromise, can have severe torsional stresses and deflections may develop because of the small polar moment of inertia at line B—B. A solution is shown in FIG. 6 where spring 40 has constant thickness and an overall width W1. A reduced width W is formed in the central section by centering notches 40 f and g. Triangular openings 40h and i are formed between the ends of notches 40f and g and the ends of the spring. Openings 40h and i are symmetrical to the longitudinal axis of spring 40. The apexes of the openings 40h and i are pointed toward the central section. The corners are rounded with the apexes having a radius r. This eliminates stress concentration. The overall width of this geometry is given by the relationship $W1 = W + 2R1$. Spring 40 will be in contact with support edges 43 and 44 of platform 41 over its full width W1 if the point of contact with the cams is restricted to the central ⅔ of W1. As previously discussed this is achieved by contouring the convex surface 24b and the corresponding surface on hinge element 22. FIG. 8 shows another spring 40 with uniform width for its entire length and having a centering slot 40j between triangular openings 40h and i. Slot 40j is aligned with and symmetrical with the longitudinal axis of spring 40 as are openings 40h and i. Slot 40j is also located symmetrically with respect to the center of spring 40. The ends of slot 40j have a radius to prevent stress concentrations caused during bending of the spring.

Figure 9:
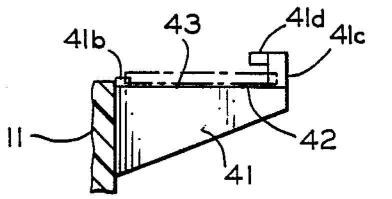
FIG. 9 is an end sectional view of a fragment of FIG. 2 showing a first embodiment of the spring support structure of the tractor frame.
Figure 10:
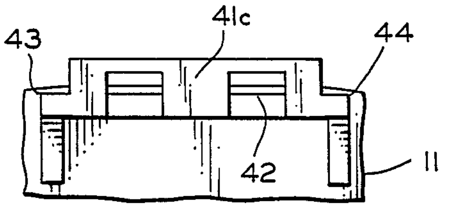
FIG. 10 is a side elevational view of the spring support structure of FIG. 9.
Figure 11:
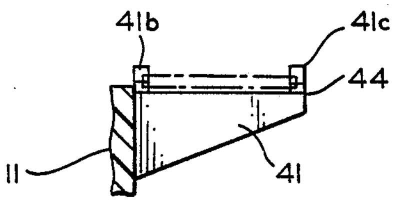
FIG. 11 is an end sectional view of a second embodiment of the spring support structure for use in the tractor of FIG. 2.
Figure 12:
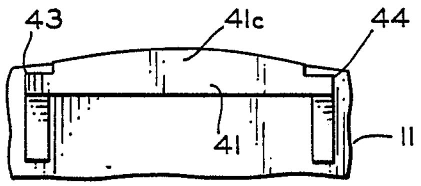
FIG. 12 is a side elevational view of FIG. 11.
Figure 13:
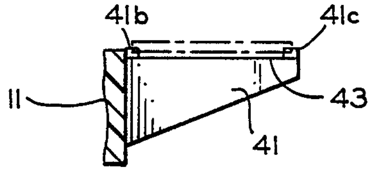
FIG. 13 is an end sectional view of a third embodiment of a spring support for use in the tractor of FIG. 2.
Figure 14:
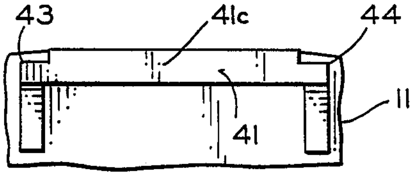
FIG. 14 is a side view of FIG. 13.
Figure 15:
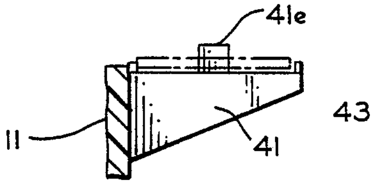
FIG. 15 is an end sectional view of a fourth embodiment of a spring support structure for the tractor of FIG. 2.
Figure 16:
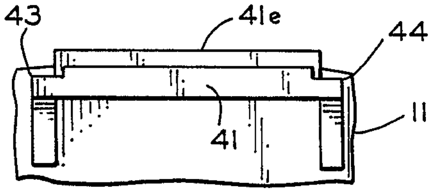
FIG. 16 is a side elevational view of FIG. 15.

As best seen in FIGS. 9, 11 and 13, platform 41 has centering means comprising tongues 41b and c which engage spring 40 in notches 40f and g. Spring 40 is shown in broken lines in all these figures. FIG. 9 shows tongue 41c with an overhang 41d which prevents spring 40 from being accidentally dislodged from platform 41. Overhang 41d is made high enough above the central section of spring 40 so that it cannot interfere with the bowing of spring 40 between support edges 43 and 44. FIGS. 15 and 16 show platform 41 having centering post 41e which is received within slot 40j (see FIG. 8) of spring 40. The dimensions of slot 40j and post 41 are such that spring 40 can freely bow between support edges 43 and 44 and will lift above the top of post 41e. Both centering post 41e and tongues 41b and c also serve to align the longitudinal axis of spring 40 with the common axis formed by hinge pins 30 and 31. Specifically, spring 40 is aligned so that its longitudinal axis at all times lies in a plane through the common axis which is parallel with the edge of door 12. With such structures, precise alignment and centering are attained within a structure which is easy to manufacture and assemble.

It is easily seen that assembly is greatly simplified when compared to coil spring, wire and cantilever spring hinges. Spring 40, which is a flat piece in its relaxed state, need merely be placed in position of platform 41 between tongues 41b and c or on post 41e. Door 12 is then assembled by aligning the grooves 25 and 26 of hinge elements 21–24 with hinge posts 28 and 29. This automatically locates the cam surfaces of hinge elements 22 and 24 with the ends of spring 40. Pressure is applied to the edge of door 12 the hinge pin holes are aligned whereupon hinge pins 30 and 31 are pressed therein. Disassembly is performed just as easily with the hinge pins being removed first.

It is therefore readily apparent that a feed mechanisms is provided with a door and spring assembly which has the advantages of simplicity, ease of manufacture and assembly and produces improved operation for constraining paper in place on the feed pins of the feed belts. It is also apparent that a mechanism is provided which is convenient to operate and which avoids damage when used in printers.

While the invention has been particularly shown and described with reference to preferred embodiments thereof, it will be understood by those skilled in the that changes in form and details may be made thereto without departing from the spirit and scope of the invention.

What is claimed is:

1. A feed mechanism for a printer comprising in combination a tractor body, a door having hinge elements, pivot means connecting said hinge elements to said tractor body and permitting rotation of said door back and forth between first and second positions, a platform on said tractor body between said hinge elements, cam means on each of said hinge elements and rotatable with said door, said cam means having a common axis with said pivot means, said cam means having first and second cam surfaces radially displaced from said common axis, and an elongate flexure beam assembled to said tractor body and which serves to apply a spring force to said cam means for moving said door to said first and second positions, wherein:

said flexure beam is a straight piece in its relaxed state prior to assembly to said tractor body, said flexure beam is held in flexed condition with a continuous bend by said platform and said cam means, and said flexure beam is simply supported between its ends by said platform and frictionally engaged at its ends by said first and second surfaces of said cam means.

2. A feed mechanism for a printer in accordance with claim 1 in which said flexure beam comprises a single flat spring, and said platform comprises a horizontal surface for simply supporting said flat spring with said continuous bend and with the longitudinal axis of said spring lying in a plane through said common axis of said cam means.

3. A feed mechanism for a printer in accordance with claim 2 in which said horizontal surface of said platform comprises parallel coplanar support edges extending transversely to said common axis of said cam means, and said spring is simply supported between its ends by said parallel support edges, and said continuous bend of said spring includes the portion between said parallel support edges.

4. A feed mechanism for a printer in accordance with claim 3 in which said flat spring is a thin steel spring with a constant thickness, and said steel spring is tapered for a portion of its length on either side of said support edges and toward its ends.

5. A feed mechanism for a printer in accordance with claim 4 in which said steel spring has constant width and has triangular openings over a portion of its length on either side of said support edges with the apex of said openings pointing toward said support edges.

6. A feed mechanism for a printer in accordance with claim 2 in which said first surface of said cam means is a convex surface and said second surface is a planar surface, and said ends of said spring are engaged by said convex surface on one side of said longitudinal axis when said door is in said first position and by said planar surface on both sides of longitudinal axis when said door is in said second position.

7. A feed mechanism for a printer in accordance with claim 6 in which said ends of said spring are engaged on either side of said longitudinal axis by said convex surface during rotation of said door between said said first and second positions.

8. A feed mechanism for a printer in accordance with claim 7 in which said ends of said spring are engaged by said convex surface of said cam means during rotation of said door along a contact line which is transverse to and bisected by said longitudinal axis of said spring.

9. A feed mechanism for a printer in accordance with claim 8 in which the length of said transverse contact line is no greater than $\frac{2}{3}$ the width of said ends of said spring.

10. A feed mechanism for a printer in accordance with claim 3 in which said platform further includes alignment means on said flat surface for maintaining said longitudinal axis of said spring aligned with said common axis of said cam means.

11. A feed mechanism for a printer in accordance with claim 10 in which said alignment means comprises an alignment groove in said support surface of said platform, and said portion of said spring between its ends sets and is simply supported within said alignment groove.

12. A feed mechanism for a printer in accordance with claim 3 in which said platform further includes centering means for maintaining said spring centered relative to said hinge elements whereby said ends of said spring are prevented from moving longitudinally and becoming disengaged from said cam means.

13. A feed mechanism for a printer in accordance with claim 12 in which said centering means comprises tongue means on said platform for engaging groove means in at least one edge of said spring.

14. A feed mechanism for a printer in accordance with claim 12 in which said centering means comprises post means on said platform for engaging a post opening in said spring.

15. A feed mechanism for a printer in accordance with claim 6 which further includes stop means for arresting the movement at said door at said first position, and the radius of said convex surface from said common axis to the point where it engages said ends of said spring in said first position is greater than the radius to the center of said planar surface whereby said spring applies a greater spring force to said cam means in said first position than in said second position.

16. A feed mechanism for a printer in accordance with claim 2 in which said first and second surfaces of said cam means are beveled surfaces on said hinge members.

17. A forms feed mechanism for a printer comprising frame means having a guide surface and a feed belt means for advancing print forms along said guide surface, said frame means having first and second frame hinge means and spring support means positioned between said frame hinge means along one side of said frame means, door means including first and second door hinge means connected by pivot means to said first and second frame hinge means to allow said door to rotate around a hinge axis to an open angular position from a closed position above said feed belt, said hinge axis lying in a plane outside and parallel with the edge of said forms, said door means including rotary cam means formed on said first and second door hinge means and rotatable with said door around said hinge axis, said cam means having a radial camming surface including convex and planar sections at different angular positions of said camming surface, said planar section forming a detent position for maintaining said door in an open position, and spring means comprising an elongate elastic beam member, said beam member having a central section simply supported by said spring support means with opposite end sections deflected and frictionally engaged by said camming surfaces of said rotary cam means, said beam member producing a spring force for biasing said door toward said closed or said open position when engaging said convex section during the rotation of said door and for holding said door in said detent position when engaging said planar section of said camming surface of said rotary cam means.

18. A forms feed mechanism in accordance with claim 17 in which said spring means is a flat spring having a horizontal axis aligned with said hinge axis of said cam means, and said spring force for biasing said door toward said closed or said open position is produced by said convex section engaging said end sections of said flat spring alternately on opposite sides of said horizontal axis during rotation of said door.

19. A forms feed mechanism in accordance with claim 18 in which said convex section of said radial camming surface has a radius relative to said hinge axis greater than the radius of said planar section, and said convex section engages said end sections of said flat spring on one side of said horizontal axis when in said closed position whereby said biasing force produced by said flat spring is greater in said closed position.

20. A forms feed mechanism in accordance with claim 17 in which said radial camming surface includes a second convex section angularly displaced at the end of said planar section, and said second spring member produces a bias force for rotating said door toward or away from said detent position when said second convex section engages said end sections of said spring member as a result of rotation of said door beyond said detent position.

21. A forms feed mechanism in accordance with claim 20 in which said convex, planar and second convex sections of said radial camming surface have different radii relative to said hinge axis.

* * * * *